United States Patent [19]
Resh

[11] 3,739,264
[45] June 12, 1973

[54] GRAIN MOISTURE TESTER
[75] Inventor: Roy E. Resh, Bettendorf, Iowa
[73] Assignee: Agridustrial Electronics, Inc., Bettendorf, Iowa
[22] Filed: June 11, 1971
[21] Appl. No.: 152,186

[52] U.S. Cl. ............................................. 324/61 R
[51] Int. Cl. ........................................... G01r 27/26
[58] Field of Search .................. 324/61, 65; 177/50

[56] References Cited
UNITED STATES PATENTS

| | | | |
|---|---|---|---|
| 3,681,685 | 8/1972 | Tarry et al. | 324/61 QS |
| 2,693,575 | 11/1954 | Greenwood et al. | 324/61 P |
| 2,266,114 | 12/1941 | Bartlett | 324/61 P |
| 1,105,618 | 8/1914 | Christianson | 177/50 X |
| 3,566,260 | 2/1971 | Johnston | 324/61 R |
| 2,774,938 | 12/1956 | Edinborgh | 324/61 R |

Primary Examiner—Alfred E. Smith
Attorney—Henderson & Strom

[57] ABSTRACT

To provide a lightweight, portable tester, the bottom of an upper cylindrical aluminum container that is the housing for a test cell fits tightly into a lower cylindrical aluminum container that is a base and chassis for electrical circuits that measure permittivity. The upper container has a coaxial cylindrical inner electrode in which a spring scale is mounted, and since the tester is lightweight, the scale is used to measure a sample by weighing the sample along with the entire tester. Polystyrene foam surrounding the inner electrode distributes the sample quite evenly as it is poured into the cell and spaces the grain from the inner electrode to prevent points of concentration of electric field. To compensate for change in permittivity resulting from change in temperature of the sample, a temperature-sensing capacitor is mounted within the cell. A disabling circuit connected to a light-emitting-diode indicator provides a warning that the voltage of a battery is too low to provide reliable readings.

13 Claims, 4 Drawing Figures

PATENTED JUN 12 1973
3,739,264
SHEET 1 OF 2
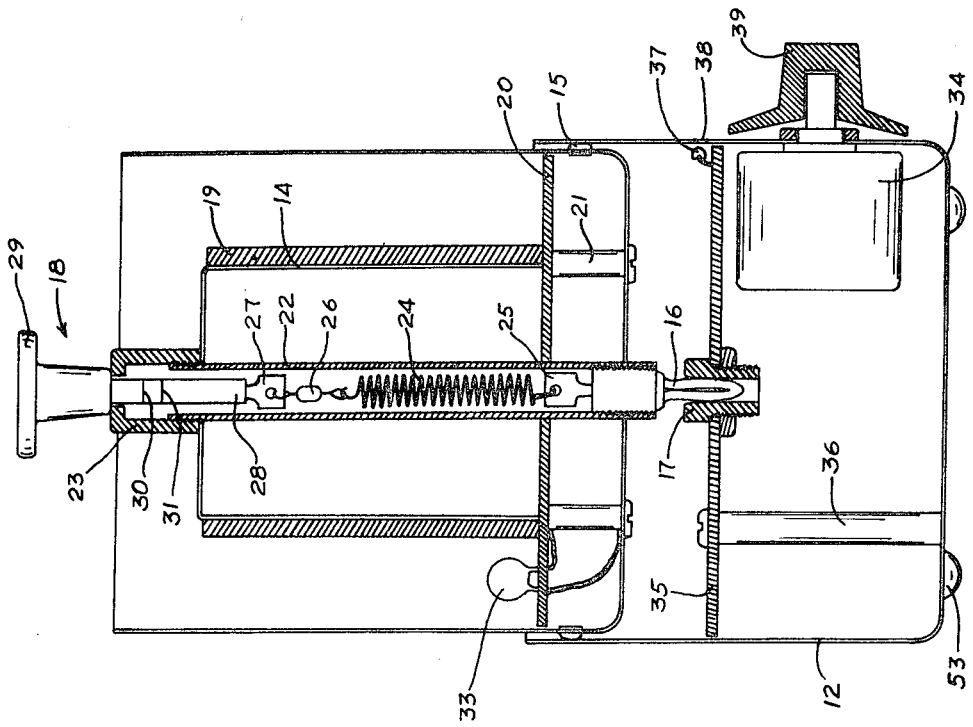
FIG. 3
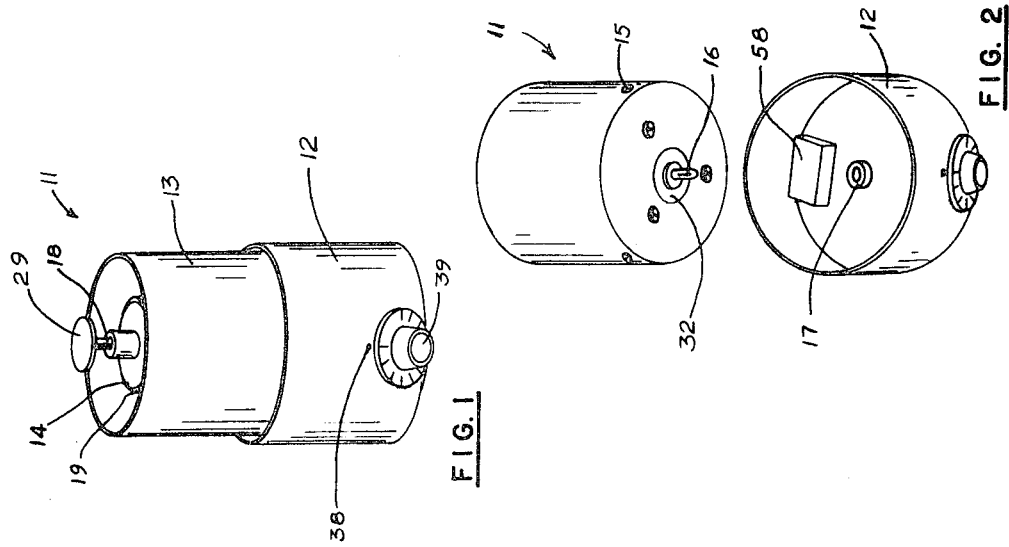
FIG. 1
FIG. 2
INVENTOR.
ROY E. RESH
BY Henderson and Strom

GRAIN MOISTURE TESTER

BACKGROUND OF THE INVENTION

This invention relates to testers for measuring permittivity of materials and particularly to testers for measuring the moisture content of grain by measuring its permittivity.

Grain-moisture testers of the capacitive type usually comprise a pair electrodes or parallel plates and electronic means to measure permittivity of grain by measuring change in capacitance between the electrodes caused by placing grain between them. Preferably, an outer electrode is a conductive cylindrical container, and an inner electrode is a conductive cylinder of smaller diameter mounted coaxially therein. The electrodes are connected to an electronic signal generator, and the effect of the addition of grain between the electrodes is measured. In certain testers, the electrodes are connected in a series capacitive circuit connected to the output of the generator, and a change in voltage is measured; in other testers, the electrodes are in the tuning circuit of the generator, and change in frequency is measured.

In order to obtain reliable test results, the mass of grain placed between the electrodes must be the same for successive tests. To obtain equal masses and even distribution of electrical field, the grain should be packed such that it is evenly distributed and pressed together a like amount for each test. According to U.S. Pat. No. 2,251,641 issued to F.W. Stein on Aug. 5, 1941, a loading device having a hinged cover for a bottom is used to measure materials, and the cover is unlatched to fill a test cell that is positioned below the loading device. A separate loading funnel is described in U.S. Pat. No. 2,693,575, issued to K.M. Greenwood et al. on Nov. 2, 1954 and the central electrode is cone-shaped to alleviate the concentration of electric field at the lower portions of the cell as a result of packing. Also, a thin plastic sleeve surrounds the central electrode to decrease concentration of field that results from electrical contact between the material being tested and the electrode. Still other testers use spring scales for weighing only a separate hopper to determine the amount of material to be conveyed from the hopper to the test cell.

SUMMARY OF THE INVENTION

An object of this invention is to provide a moisture tester that is reliable, and that is easier to use, and more economical to manufacture than prior testers.

A tester according to this invention is easy to use because the test cell can be loaded directly with an exact amount to provide reliable readings. Loading merely requires the pouring of the material to be tested directly into the cell while the cell and an attached measuring circuit are supported and weighed by a spring scale. In order to weigh the material in this manner, the entire tester is lightweight.

The housing of the tester comprises two cylindrical, aluminum containers or cans; the bottom of an upper container fits tightly into the top of a lower container. The upper container is the outer electrode of the test cell and the lower container is the chassis for the required electronic circuit. A coaxial inner electrode of the cell extends upwardly from an insulated bottom in the upper container, and it contains a spring scale for weighing the entire tester and the sample while it is being poured into the cell. A plastic foam insulator surrounding the wall of the inner electrode insures reliable reading when a test cell is filled by this easy method. The insulator is quite thick and has a dielectric constant not much greater than one in order to prevent concentration of field at points near the inner electrode. The amount of surface friction offered by the insulator that is preferably made from closed-cell polystyrene foam, aids in the even distribution of grain while it is being poured into the cell.

The electrical circuit housed in the lower container includes a signal generator having its output connected through a series resistor to the test cell. The series resistor and potentiometers in the test circuit contribute to easy calibration. A circuit for determining threshold voltage includes a Schmitt trigger circuit having an alternating-current control circuit. The use of alternating-current voltage for triggering provides a definite threshold point. At the point of threshold, the trigger circuit applies signal through a transistor to a light-emitting diode used as an indicator. A circuit for biasing this transistor is part of a circuit for disabling the tester when the voltage of the source of supply drops below the level at which the tester will operate accurately. To compensate for change in temperature, a temperature-compensating capacitor is connected across the cell and is mounted directly in the cell to acquire the same temperature as the material that is being tested.

BRIEF DESCRIPTION OF THE DRAWING

FIG. 1 is a top oblique view of the grain moisture tester of this invention;

FIG. 2 is a view of the tester showing the test cell disengaged from its base that contains electronic circuits;

FIG. 3 is a diametral cross-section of the assembled grain moisture tester; and

DESCRIPTION OF THE PREFERRED EMBODIMENT

Figure 4:
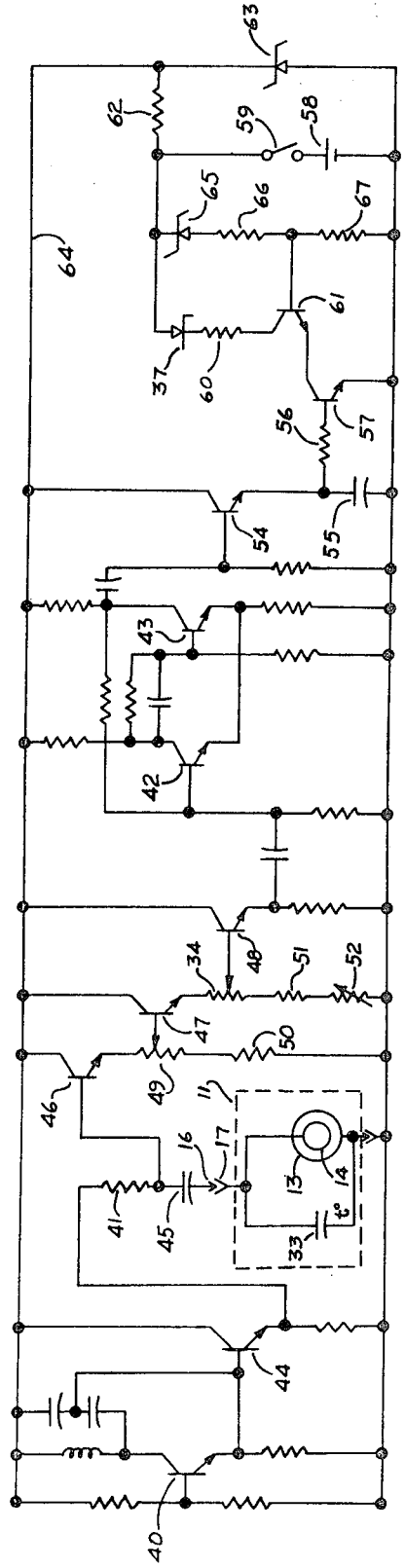
FIG. 4 is a schematic wiring diagram of the circuits for measuring permittivity.

The grain moisture tester shown in FIG. 1 has two aluminum, cylindrical containers that function as a base 12 and a test cell 11. The diameters of the containers differ enough to provide a tight fit as the bottom portion of the test cell 11 is pressed into the top portion of the base 12. The vertical wall 13 of the test cell 11 is the outer electrode, and the inner electrode 14 is an aluminum container mounted coaxially within the wall 13. Electrical circuits for determining capacitance between the electrodes are mounted in the base 12.

The test cell 11 can be readily pulled from the base 12 as shown in FIG. 2 to provide access to circuit components. A plurality of rivets 15 may be spaced apart on a circumference near the bottom of the vertical wall 13 of the test cell to provide a desirable amount of friction and good electrical contact between the outer wall of the test cell 11 and the inside surface of the wall of the base 12 as they are pressed together. As the cell 11 is pressed into the base 12, a banana plug 16 mounted on the axis of the test cell 11 engages its mating socket 17 mounted on the axis of the base 12 to complete a circuit between the inner electrode 14 and the electrical measuring circuits in the base 12.

A spring scale 18 of FIG. 1 has a scale that extends upwardly from the axis of the inner electrode 14. This scale facilitates measurement of a sample to be placed in the annular space between the electrodes of the cell 11. In order for the measurement of permittivity to be accurate, the amount of material added to the cell 11 must be a specific amount for which the electrical circuits are calibrated, and also the material must be packed for every sample in about the same manner. Since the grain moisture tester is compact and the containers and electrodes are aluminum, the complete tester is light enough to permit the accurate determination of the amount of sample by simply weighing the sample and the complete tester together. The tester is filled while supporting it by the handle 29 of the spring scale 18 as material to be tested is added until a selected calibration mark appears on the scale. Obviously, after a test reading, the tester is inverted to pour out the sample.

The accuracy of the reading is dependent upon the evenness of the packing of the material to be tested, and particularly upon the packing close to the inner electrode 14. Prior testers have used thin insulating material about the inner electrode to prevent close contact with the electrode and thereby to decrease concentration of the field at the points of greatest contact. In this tester, a thick layer of insulating material 19 having a dielectric constant not much greater than one covers the outer surface of the inner electrode 14. For best results, the ratio of the thickness of the insulator to the radius of the inner electrode 13 should be about 1:11.

The insulator is preferably made from polystyrene foam. The closed-cell type of foam is required to exclude moisture and to provide a desirable amount of friction between the foam and the grain that is to be tested. Not only does the thickness of the insulator and its low dielectric constant greatly decrease errors caused by points of concentration of the electric field about the inner electrode, but the physical resistance offered by the surface of the closed-cell polystyrene foam helps distribute the grain evenly about the electrode and further decrease variation in intensity of the field.

The mounting for the inner electrode 14 and the spring scale 18 is shown in the cross-sectional view of FIG. 3. The bottom of that portion of the test cell that is to receive a sample is a cylindrical disk 20 of insulating material mounted above the aluminum bottom of the test cell housing on a plurality of insulating phenolic spacers 21. The spacers are mounted at equal radial distances from the center of the disk 20, and the upper ends of the spacers 21 may also be used to receive mounting screws attached to the lower edge of the inner electrode 14. The inner electrode is thereby rigidly mounted coaxially within the outer electrode to maintain stable calibration.

The spring scale 18 has a tubular housing 22 mounted axially through the inner electrode 14. The upper end of the housing 22 has an external threaded portion extending through a hole in the enclosed top of the inner electrode 14 where it is secured by a nut 23. The housing 22 is also constrained from lateral movement where it passes through a center hole in the insulated bottom 20 of the cell. The lower end of the housing 22 has an internal thread for mounting the banana plug 16 so that it extends downwardly to engage socket 17 within the base 12. A calibrated coil spring 24 has a lower end hooked into an eye of a terminal 25 connected to the screw fitting of the banana plug 16. The upper end of the spring 24 is hooked to the lower terminal of a swivel 26, and the upper end of the swivel is hooked to the eye of a terminal 27 extending from the lower end of a calibrated, round rod 28 that has a circumferential scale marked on it. The top of the nut 23 has a central hole with a diameter smaller than the inside diameter of its threaded portion that engages the housing 22, and the upper end of the rod 28 is an easy sliding fit within the hole. A handle 29 is fastened to the top of the scale rod 28 for supporting the tester while the sample to be tested is added to the test cell 11. The bottom of the handle 29 contacts the top of the nut 23 to function as a stop in the downward direction of the scale rod. The swivel 26 may be of the type used with fishing equipment. The swivel permits the moisture tester to be rotated while it is supported by its handle 29 without changing the calibration of the spring 24.

Suitable circumferential marks 30 and 31 are placed on the rod to indicate a predetermined weight when they appear at the top of the nut. For example, the mark 30 may be placed to appear when the material in the test cells weighs five ounces, and the mark 31 placed to indicate eight ounces. The marks are visible regardless of the angle of rotation of the tester with respect to the operator.

The cylindrical construction of the cell, the rugged mounting of the inner electrode, the isolated mounting of the electrical connection to the cell, and the use of a temperature-compensating capacitor mounted within the cell contribute to the accuracy of the readings and reliability of the calibration of the moisture tester over long periods. The inner electrode 14 is connected to the electrical test circuit in the base 12 through the top of the electrode and the housing 22 of the spring scale to the banana plug 16 that extends below the test cell for engaging the receptacle 17. A hole 32 in the bottom of the test cell as shown in FIG. 2 has sufficient diameter to keep the stray capacitance to such a low amount that it has negligible effect on the operation of the grain moisture tester.

The use of the temperature-compensating capacitor 33 shown in FIG. 3 simplifies operation of the tester and eliminates the reference to temperature in charts in which moisture content is tabulated for different readings of a calibrated control. As shown, the capacitor extends upward into the bottom portion of the test cell where it is in contact with the material being tested. The value of the capacitor is 22 picofarads and is about equal to the value of capacitance between the electrodes 13 and 14 of the test cell during operation. The temperature characteristic of the capacitor 33 has been chosen to compensate for the change in permittivity of grain with change in temperature.

Other than a calibrated potentiometer 34, the component parts of the electrical measuring circuit within the base 12 are mounted on a circular, glass epoxy circuit board 35 of FIG. 3. The board is mounted parallel to the bottom of the base by a plurality of hex spacers 36 secured thereto. The center electrode 14 is connected through the banana jack 16 to the electrical test circuit, and the outer electrode 13 that is the outer housing of the test cell is connected through the rivets 15 to the housing of the base 12, the housing being the common circuit of the test circuit.

The calibrated potentiometer 34 is mounted near the bottom of the tester through the cylindrical wall of the base 12. A solid-state indicator light 37 is mounted on the circuit board 35 above the potentiometer 34 close behind a small opening 38 (FIG. 1) directly above a calibrated knob 39 of the potentiometer.

The electrical circuit of FIG. 4 includes a signal generator having a transistor 40 for applying signal through a series resistor 41 to the electrodes of the test cell 11. The proportion of the total signal voltage appearing across the cell is dependent on the moisture content of grain or other material placed in the cell. The level of voltage appearing across the cell is measured by adjusting a calibrated potentiometer 34 to obtain a predetermined level of output at its arm. This predetermined level is just sufficient to operate a Schmitt trigger circuit comprising the transistors 42 and 43. Operation of the Schmitt trigger circuit causes the light-emitting diode 37 to be illuminated to indicate that the arm of the potentiometer 34 has been rotated to a position where the threshold voltage has been reached.

In more detail, the transistor 40 is connected in a conventional Colpitts oscillator circuit for developing a signal of 70KHz, and signal from the oscillator is applied through an isolating, emitter-follower stage including the transistor 44 to a series circuit for dividing the output voltage of the oscillator according to the capacitance between the electrodes 13 and 14 of the cell 11. The series circuit comprises the voltage-dropping resistor 41, a coupling capacitor 45, the banana plug and jack 16 and 17, and the test cell 11 as a capacitor including the parallel temperature-compensating capacitor 33.

A three-stage amplifier including the transistors 46, 47, and 48 has it input connected across the electrodes 13 and 14 of the test cell 11 through the capacitor 45 and through the common return circuit provided by the outer walls of the containers of the cell 11 and the base 12. The first stage of the amplifier is an emitter-follower type having a potentiometer 49 and a resistor 50 in series in the emitter circuit of the transistor 46. The potentiometer 49 determines the maximum signal level to be applied through the succeeding, calibrated potentiometer 34. Signal from the arm the potentiometer 49 is applied to the input of a second stage having the calibrated potentiometer 34 in the emitter circuit of the transistor 47 in series with a resistor 51 and a variable resistor 52. The adjustment of the resistor 52 provides the proper range of the potentiometer 34 to agree with its calibrated dial. The third stage has the transistor 48 connected in an emitter-follower arrangement with its input being connected to the arm of the potentiometer 34 and its output capacitively coupled to the base of the transistor 42 of the Schmitt trigger circuit.

The potentiometer 34 is calibrated to indicate change in capacitance between the electrodes 13 and 14 of the test cell 11 according to its scale and the readings on a chart for moisture content of grain. First, the knob 39 of the potentiometer 34 is rotated to a position for maximum reading and while a reference capacitor having a capacitance equal to the maximum capacitance to be measured is substituted for the test cell 11, the potentiometer 49 is adjusted to the point where the indicator light just turns on. In a like manner, the knob 39 is set for minimum reading and while a different reference capacitor having a capacitance equal to the capacitance for minimum moisture content is substituted for the cell, the variable resistor 52 is adjusted. Although the adjustable potentiometer 49 and the resistor 52 are mounted on the circuit board 35 (FIG. 3), they are readily accessible for adjustment because each is positioned opposite a respective one of the rubber feet 53 inserted in holes in the bottom of the base 12. While the respective rubber foot is removed, the adjustment can be made readily by a screw driver.

To obtain a reading of permittivity for a sample of grain within the test cell, the dial of the potentiometer 34 is rotated from a position that provides minimum signal voltage at the output of the transistor 48 in the direction of increasing voltage until the Schmitt trigger circuit (transistors 42 and 43) just starts to operate as indicated by illumination of the light-emitting diode 37. The Schmitt trigger circuit is conventional, but rather than using direct-current voltage for triggering, alternating-current voltage from the output of the transistor 48 of the amplifier stage is applied to the base circuit of the transistor 42. By using alternating-current voltage, the threshold is sharper in that the Schmitt trigger circuit starts operation at very close to the same voltage every time.

The output of the Schmitt trigger circuit is applied to the base circuit of a transistor 54, and the emitter of the transistor 54 is connected to a filter capacitor 55 and also through a resistor 56 to the base of a transistor 57. The transistor 54 becomes conductive only during the positive peaks of the wave form of the output of the Schmitt trigger circuit so that only short bursts of current are conducted from the emitter of the transistor 54 to the capacitor 55. The capacitor has sufficient capacitance to filter the voltage derived from the peaks of current so that the transistor 57 is maintained conductive while the Schmitt trigger circuit is operating. The path of the current for illuminating the light-emitting diode 37 can be traced from the positive terminal of the battery 58, through the off-on switch 59, the light-emitting diode 37, a resistor 60, the emitter-collector circuit of a transistor 61, through the emitter-collector circuit of the transistor 57 and the common-return circuit to the negative terminal of the battery 58. An advantage of using the light-emitting diode 37 is its low drain on the battery 58.

After the voltage of the battery 58 becomes low but before it drops below a level at which the circuit for measuring permittivity becomes unreliable, the bias voltage on the base of the transistor 61 is removed to disable the circuit connected to the light-emitting diode 37. A circuit for supplying direct current extends from the switch 59 through the dropping resistor 62 to the positive supply line 64 of all the electrical circuits except the circuit of the light-emitting diode. The voltage on this line is regulated by the Zener or breakdown diode 63 connected between the line and the common return circuit. The bias circuit for the transistor 61 does not include the resistor 62 for it is connected to the battery directly through the off-on switch 59, and it includes a Zener diode 65, a resistor 66, and a resistor 67 in a series circuit connected across the battery. The base of the transistor 61 is connected to the point of junction between the resistors 66 and 67. While the voltage of the battery 58 is high enough to operate the measuring circuits reliably, the Zener diode 65 is conductive and sufficient voltage is developed across the resistor 67 to provide the required bias to the base of the transistor 61 to make it conductive in response to operation of the Schmitt trigger circuit. As the voltage of the battery drops, the Zener diode 65 quits conducting before the Zener diode 63 becomes nonconductive and removes the operating bias from the transistor 61. Since a reading cannot be obtained on the moisture tester, the operator realizes that a new battery ought to be installed.

The grain moisture of this invention is reliable and is easily portable for carrying to various locations where grain needs to be tested. The temperature compensation aids in providing accurate readings at various temperatures encountered where material is to be tested. The integration of the scale for measuring the samples aids in quick, accurate measurements of moisture content. The table showing moisture content for the readings obtained on the dial 39 is readily applied to the outer surface of the tester for easy quick reference.

What is claimed is:

1. A grain moisture tester comprising a test cell having a cylindrical container constituting an outer electrode and a cylindrical conductor constituting an inner electrode mounted coaxially within said container and insulated therefrom, an insulator closely surrounding the cylindrical wall of said inner electrode to simulate an air gap, the dielectric constant of said insulator being substantially one, the ratio of thickness of said insulator and the outside radius of said inner electrode being approximately 1:11 and means connected electrically to said electrodes for measuring permittivity of a sample placed between said electrodes.

2. A grain moisture tester as claimed in claim 1 in which said insulator is made of closed-cell polystyrene foam.

3. A grain moisture tester comprising a test cell having a first cylindrical container constituting an outer electrode and a cylindrical conductor constituting an inner electrode mounted within said first container and insulated therefrom, a spring scale having a mounting member, an elongated scale member and a spring, said scale member having an inner end slidably mounted within said mounting member, said spring interconnecting said mounting member and the inner end of said scale member, means for securing said mounting member coaxially within said cylindrical conductor to extend the outer end of said scale member coaxially upwardly from said first container, and electrical circuit means connected to said electrodes for measuring permittivity of a sample placed between said electrodes, said grain moisture tester having a second cylindrical container, said electrical circuit means for measuring permittivity being mounted within said second container, the bottom portion of said first container being mounted within the top portion of said second container, said first container having spaced above its bottom a disk of insulating material as a bottom of that portion of the test cell to hold a sample to be tested, the bottom of said first container having a concentric opening, plug-in connecting means having a portion secured to said disk and connected to said inner electrode and a mating portion secured to said circuit means within said second container, said connecting means extending through the center of said concentric opening to provide conduction from said inner electrode to said circuit means, the spacing between said bottom of said second container and said connecting means being sufficient to prevent significant stray capacitance therebetween.

4. A grain moisture tester as claimed in claim 3 wherein said electrical circuit means includes signal generating means and a resistor, said resistor and said test cell being serially connected in the output of said signal generating means, and voltage measuring means connected to said test cell for measuring the voltage developed thereacross.

5. A grain moisture tester as claimed in claim 4 wherein a temperature-compensating capacitor is connected in parallel with the electrodes of said test cell and mounted within said portion of said test cell to receive a sample.

6. A grain moisture tester as claimed in claim 4, wherein said voltage measuring means includes a Schmitt trigger circuit having an input responsive to application of alternating-current voltage to cause it to change state for each peak of said applied voltage above a threshold value, alternating-current amplifier means connecting said test cell and the input triggering circuit of said Schmitt trigger, and indicating means connected to the output of said trigger circuit to show the operation thereof.

7. A grain moisture tester as claimed in claim 4 wherein said electrical measuring means includes a low-voltage disabling circuit, a source of voltage connected to supply power to said electrical measuring means, said voltage measuring means including an indicator circuit, a transistor having an input control circuit and an output circuit, said output circuit being connected through said indicator circuit to said source of voltage, means connected between said test cell and said input control circuit to apply control signal to said input control circuit in response to the voltage developed across said test cell exceeding a predetermined amount, biasing means including a serially connected break-down diode and a resistor connected across said source of voltage, said biasing means also being connected to said input control circuit, said break-down diode normally being conductive to provide the proper bias to said transistor to make it conductive in response to said voltage across said test cell exceeding said predetermined amount, said indicator operating in response to conduction through said transistor, and said break-down diode becoming nonconductive in response to the voltage supplied by said source of voltage dropping below a predetermined desirable amount for operating said electrical measuring means, thereby preventing conduction through said transistor and preventing operation of said indicator.

8. A grain moisture tester as claimed in claim 7 having an insulator closely surrounding the cylindrical wall of said inner electrode the dielectric constant of said insulator being substantially one and its thickness being sufficient to prevent substantial concentration of electric field near said inner electrode as a result of unavoidable unevenness in the packing of a sample placed between said electrodes, said means connected between said test cell and said input control circuit including a Schmitt trigger circuit having an input responsive to application of alternating-current voltage to cause it to change state for each peak of voltage above a threshold amount.

9. A grain moisture tester comprising a test cell having a cylindrical container constituting an outer electrode and a cylindrical conductor constituting an inner electrode mounted coaxially within said container and electrically insulated therefrom, circuit means connected to said electrodes for measuring the permittivity of a sample placed between said electrodes, a chassis attached to the bottom of said test cell as a base therefor, said circuit means being mounted within said chassis, and a spring scale permanently fastened to said test cell and calibrated to determine the weight of a sample contained within the cell by weighing said grain moisture tester as a unit, said spring scale comprising a coil spring, an elongated scale member, and a handle, said coil spring and the lower end of said elongated scale member being disposed in said cylindrical conductor, the lower end of said coil spring being fastened to the lower end of said cylindrical conductor, the upper end of said coil spring being connected to the lower end of said elongated scale member, the upper end of said elongated scale member protruding upwardly from the upper end of said cylindrical conductor, and said handle fastened to the upper end of said elongated scale member.

10. A grain moisture tester as claimed in claim 9 in which a swivel is connected in a series with said coil spring between the lower end of said elongated scale member and the upper end of said coil spring.

11. A grain moisture tester comprising first and second spaced electrodes between which grain is placed to determine its moisture content, a signal generator having its output connected to said electrodes for applying alternating current through the capacitor formed by said electrodes, a transistor having an input control circuit and an output circuit, voltage threshold sensing means having an input connected to said electrodes and an output connected to said input control circuit of said transistor, a source of voltage connected to supply power to said signal generator and to said threshold sensing means, an indicator connected to the output of said transistor, said transistor normally operating between a nonconductive condition and a conductive condition in response to the voltage level across said cell passing through a predetermined level sensed by said voltage threshold sensing means and thereby operating said indicator to show said threshold level, biasing means including a serially connected break-down diode and a resistor connected across said source of voltage, said biasing means also being connected to said input control circuit of said transistor, said break-down diode normally being conductive to apply required bias to said transistor to make it operative in response to the voltage across said cell passing through said predetermined level, and said break-down diode becoming nonconductive in response to the voltage supplied by said source of voltage dropping below a predetermined desirable amount for operating said signal generator and said threshold sensing means, thereby preventing conduction through said transistor and operation of said indicator.

12. A grain moisture tester as claimed in claim 11 wherein said threshold sensing means includes an alternating-current amplifier and a Schmitt trigger circuit, said alternating-current amplifier means having an input connected to said electrodes and an output connected to the input control circuit of said Schmitt trigger circuit, the output of said Schmitt trigger circuit being connected to said input control of said transistor, and said trigger circuit being responsive to application of alternating-current voltage from said amplifier means to cause it to change state for each peak of said applied voltage above a threshold amount.

13. A grain moisture tester as claimed in claim 12 having a resistor in series with said electrodes, the output of said generator being applied through said resistor to said electrodes.

* * * * *

UNITED STATES PATENT OFFICE
CERTIFICATE OF CORRECTION

Patent No. 3,739,264  Dated June 12, 1973

Inventor(s) Roy E. Resh

It is certified that error appears in the above-identified patent and that said Letters Patent are hereby corrected as shown below:

Column 3, line 30, after "insulator" insert -- 19 --.
line 40, change "variation" to -- variations --.

Column 5, line 41, after "arm" insert -- of --.

Column 10, claim 12, line 26, after "control" insert -- circuit --.

Signed and sealed this 26th day of March 1974.

(SEAL)
Attest:

EDWARD M. FLETCHER, JR.
Attesting Officer

C. MARSHALL DANN
Commissioner of Patents